United States Patent
Mottaz et al.

(10) Patent No.: US 12,338,005 B2
(45) Date of Patent: Jun. 24, 2025

(54) MANUFACTURING METHOD OF A SPACECRAFT INCLUDING A MARKING OF A SURFACE

(71) Applicants: AIRBUS DEFENCE AND SPACE SAS, Toulouse (FR); AIRBUS DEFENCE AND SPACE GmbH, Taufkirchen (DE)

(72) Inventors: Jean-François Mottaz, Toulouse (FR); Manuela Suess, Toulouse (FR); Verena Obrecht, Toulouse (FR)

(73) Assignees: AIRBUS DEFENCE AND SPACE SAS, Toulouse (FR); AIRBUS DEFENCE AND SPACE GMBH, Taufkirchen (DE)

( * ) Notice: Subject to any disclaimer, the term of this patent is extended or adjusted under 35 U.S.C. 154(b) by 0 days.

(21) Appl. No.: 18/290,583

(22) PCT Filed: Mar. 14, 2022

(86) PCT No.: PCT/EP2022/056576
§ 371 (c)(1),
(2) Date: Jan. 19, 2024

(87) PCT Pub. No.: WO2023/001414
PCT Pub. Date: Jan. 26, 2023

(65) Prior Publication Data
US 2024/0253823 A1    Aug. 1, 2024

(30) Foreign Application Priority Data
Jul. 22, 2021   (EP) ..................................... 21306028

(51) Int. Cl.
*B64G 1/58*   (2006.01)
*B41M 5/26*   (2006.01)

(52) U.S. Cl.
CPC ............... *B64G 1/58* (2013.01); *B41M 5/267* (2013.01)

(58) Field of Classification Search
CPC ............. B64G 1/58; B64G 1/22; B41M 5/267
See application file for complete search history.

(56) References Cited

U.S. PATENT DOCUMENTS

| 7,163,179 B1 | 1/2007 | Taylor |
| 7,252,890 B1 | 8/2007 | Wong |

(Continued)

FOREIGN PATENT DOCUMENTS

| DE | 19531490 A1 * | 2/1997 | ............ B41M 5/267 |
| EP | 0329884 A1 | 8/1989 | |

(Continued)

OTHER PUBLICATIONS

English translation DE19531490 (Year: 1997).*

(Continued)

*Primary Examiner* — Jason L Vaughan
*Assistant Examiner* — Amanda Kreiling
(74) *Attorney, Agent, or Firm* — Nixon & Vanderhye P.C.

(57) ABSTRACT

A method of manufacturing a spacecraft is disclosed including electing an outer cover material for the spacecraft, the outer cover material having an inner surface and an outer surface, the outer surface being electrically conductive, and the method further includes partially exposing the outer surface of the outer cover material to laser source to achieve a marking on the outer surface.

13 Claims, 2 Drawing Sheets

(56) References Cited

U.S. PATENT DOCUMENTS

| | | | |
|---|---|---|---|
| 2004/0077760 A1 | 4/2004 | Yeung | |
| 2013/0320276 A1* | 12/2013 | Farrell | B29C 65/1635 |
| | | | 252/582 |
| 2014/0356578 A1 | 12/2014 | Brandl et al. | |
| 2015/0048209 A1* | 2/2015 | Hoyt | B64G 1/58 |
| | | | 264/308 |
| 2021/0065594 A1* | 3/2021 | Burghy | B60Q 1/2696 |

FOREIGN PATENT DOCUMENTS

| | | |
|---|---|---|
| EP | 1384753 A1 | 1/2004 |
| JP | 2012024818 A | 2/2012 |

OTHER PUBLICATIONS

International Search Report for PCT/EP2022/056576 mailed May 18, 2022, 3 pages.
Written Opinion of the ISA for PCT/EP2022/056576 mailed May 18, 2022, 6 pages.

* cited by examiner

MANUFACTURING METHOD OF A SPACECRAFT INCLUDING A MARKING OF A SURFACE

CROSS REFERENCE TO RELATED APPLICATIONS

The present application is a National Phase of International Application Number PCT/EP2022/056576 filed Mar. 14, 2022, which designated the U.S. and claims priority benefits from European Application EP 21306028.8, filed Jul. 22, 2021, the entire contents of each of which are hereby incorporated by reference.

TECHNICAL FIELD

The present disclosure relates to the manufacturing of spacecrafts, and in particular the marking of spacecrafts, such as satellites or space vehicles.

TECHNICAL BACKGROUND

The marking of spacecrafts, for instance in order to indicate technical information or a trademark, is very limited for a number of reasons.

Many spacecrafts are covered by a multilayer insulation (MLI) blanket that needs to provide good thermal performances as well as having an electrically conductive outer surface in order to avoid the formation of electrical arcing when the spacecraft is exposed to ionizing radiation.

The MLI blankets are generally not marked, in order to preserve their thermal and electrical performances. Moreover, for some spacecraft such as satellites, the areas of a spacecraft that are not covered by MLI are very limited, for instance to the areas corresponding to antennas or instruments.

When there is a need to mark a surface, only few options exist so far. Marking can be performed for example using paint for areas exposed to space, and using a pen but limited to areas not being exposed to space. Using a paint require to run extensive testing to qualify this application to space conditions and notably the extreme temperature conditions and variations, the vacuum or the radiations. The risk of having particles release from this marking has also to be assessed as they can contaminate nearby equipment or instruments.

There is therefore a need for an improved solution for marking a spacecraft.

PRESENTATION OF THE INVENTION

In view of the above, one aim of the invention is to allow the marking of a spacecraft, including on outer surfaces, on larger areas than what was previously performed.

Another aim of the invention is to provide a method for manufacturing a spacecraft incorporating a marking without impairing the performances and qualification status of a multilayer insulation blanket.

To this end, it is proposed a method of manufacturing a spacecraft comprising selecting an outer cover material for the spacecraft, the outer cover material having an inner surface and an outer surface, said outer surface being electrically conductive, wherein the method further comprises partially exposing the outer surface of the outer cover material to laser source to achieve a marking on said outer surface.

In embodiments, the outer cover material is a multilayer insulation blanket.

In embodiments, the exposing the outer surface to laser source is performed such that the emissivity of the material forming the exposed surface varies between marked areas and unmarked areas. The emissivity of the material forming the exposed surface varies preferably of less than 10% between marked areas and unmarked areas.

In embodiments, the outer surface exposed to laser source is formed of a material elected within the group consisting in polyimide, black polyimide, germanium-coated polyimide, germanium-coated black polyimide, StaMet-coated polyimide and StaMet-coated black polyimide.

In embodiments, the outer surface exposed to laser source is devoid of photosensitive material.

In embodiments, the laser is a UV laser, in the wavelength range of 350-370 nm, preferably of 355 nm.

In embodiments, the method comprises performing the marking by moving the laser relatively to the exposed surface with a lateral speed comprised between 500 and 1500 mm/s, preferably a lateral speed of 1000 mm/s.

In embodiments, the laser exhibits an average power comprised between 0.5 and 2.6 W.

In embodiments, the laser is a pulsed laser operating at a frequency comprised between 1 and 50 KHz and with a pulse duration comprised between 10 and 100 nsec.

Another object of the disclosure is a spacecraft comprising an outer cover material exhibiting at least one marking on its outer surface, the spacecraft being characterized in that it is manufactured according to the method disclosed above.

In embodiments, the outer cover material of the spacecraft is a multilayer insulation blanket.

The proposed method allows marking an outer cover material of a spacecraft, such as a MLI blanket, without changing the composition of said outer cover (no materials added), nor generating any parasitic particles that would impair the operation of the spacecraft's equipment and instrument.

When the outer cover material is a MLI blanket, the marking has limited impact on the thermal performances and does not change the electrical performances of the MLI.

BRIEF DESCRIPTION OF THE DRAWINGS

Further details, aspects and embodiments of the proposed solution will be described, by way of example, with reference to the drawings, among which.

DETAILED DESCRIPTION OF AT LEAST ONE EMBODIMENT

Figure 1:
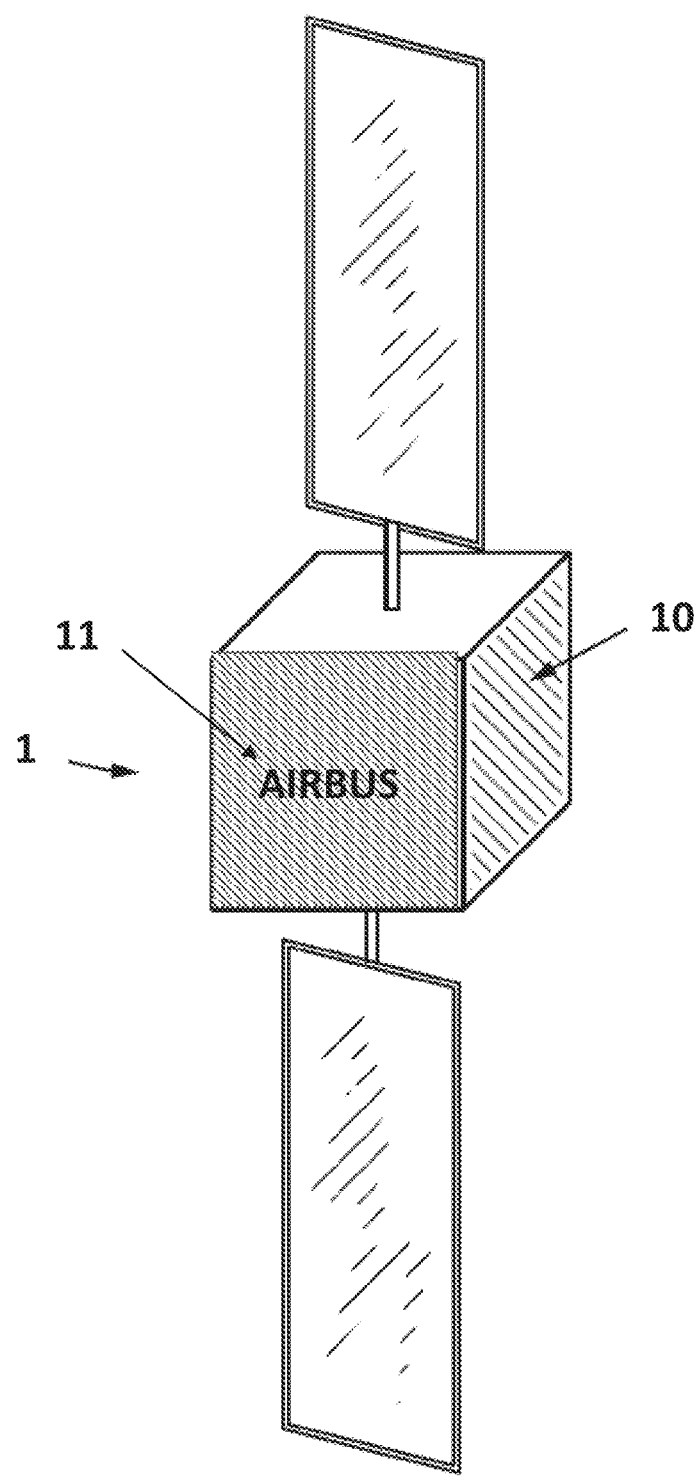
FIG. 1 schematically represents a spacecraft including a marking on a surface on an outer cover material thereof.

A method of manufacturing a spacecraft will now be described. The spacecraft 1 may be a satellite, a space probe, a space vehicle or a space station. In what follows, the word "space" designates the part of the universe that is located outside from any spacecraft.

The method comprises selecting an outer cover material 10 for the spacecraft, having an inner surface and an outer surface. By "outer surface" it is meant the surface of the cover material that is exposed to space when the cover material is assembled to the spacecraft, whereas the "inner surface" corresponds to the surface that is facing the structure of the spacecraft that is covered by the outer cover material, when the latter is assembled to the spacecraft.

As the outer surface of the outer cover material may be exposed to ionizing radiations, said surface is electrically conductive in order to prevent electrical charges from accumulating and to form potential differences that can lead to formation of electrical arcing that could damage the spacecraft. The outer surface of the outer cover material is thus equipotential, i.e. it exhibits the same electrical potential on its entire surface. The outer cover material 10 may also be thermally insulating. In embodiments, the outer cover material may be a multilayer insulation blanket, which may comprise a plurality of stacked thermally insulating layers, and an external layer that has an outer surface which is electrically conductive.

The method further comprises exposing the outer surface of the outer cover material to laser source, in order to achieve a marking 11 on said outer surface.

The marking 11 may comprise characters, numbers, symbols or logos. The content of the marking may be technical, informational or commercial.

When the marking 11 is performed on the outer surface of the outer cover material, said marking can thus be visible from the outside of the spacecraft, either during manufacturing of the spacecraft or during its operation.

The surface that is exposed to laser source in order to be marked is preferably formed of a material elected within a group consisting in:
  black polyimide (or black Kapton), which is loaded with conductive carbon in order to be electrically conductive,
  germanium-coated polyimide,
  germanium-coated black polyimide,
  StaMet-coated polyimide, StaMet-coated black polyimide,
Where StaMet corresponds to a silicon aluminum alloy.

For instance, the outer cover material may comprise a plurality of thermally insulating layers made of polyimide (or trade name Kapton). An external layer of the outer cover material may also be made of polyimide, or, in order to have an outer surface electrically conductive, may be formed of black polyimide or any of the previously-mentioned coated polyimide materials.

It has been found out by the inventors that no preliminary treatment of the surface exposed to laser source is required, nor any change in the composition of the cover material. No additive, in particular no addition of any photosensitive material or coating is required in order to allow achieving visible marking of the exposed surface. The absence of paint also removes any risk of degradation of the paint under the conditions present in space (vacuum, thermal aging, exposure to UV radiations), and pollution of the nearby equipment or instrument.

The laser marking achieved on the outer surface of the outer cover material of the spacecraft does not remove any matter from that surface, thereby preserving its physical integrity.

Furthermore, such materials may be laser-marked while maintaining an electrical outer surface conductivity and with a limited impact on thermal performances of the outer cover material, and without producing contamination particles. In particular, the exposing the outer surface to the laser source may involve varying the emissivity of the outer surface. However, the laser-marking is performed such that the emissivity of the material forming the exposed surface varies of less than 10% between marked areas and unmarked areas.

To this end, the laser may be a pulsed laser operating in the UV range, and more specifically in a range of 350-370 nm, for instance equal to 355 nm.

The pulses of the laser may be set to last between 10 and 100 ns, the pulses being emitted at a frequency comprised between 1 and 50 KHz and preferably 40 kHz. The repetitions of impulses are comprised between 1 and 25. The number of repetitions corresponds to the number of repetitions of the same parameter set which is applied 30 to the substrate in order to improve the visibility. The focus is set at the focal point. The average power of the laser may be comprised between 0.5 and 2.6 W.

The marking may be performed by moving the laser relatively to the exposed surface with a lateral speed comprised between 500 and 1500 mm/s, for instance equal to 1000 mm/s.

The area covered by the marking can be greater than 10 cm$^2$, preferably greater than 100 cm$^2$, for instance comprised between 100 cm$^2$ and 1 m$^2$, depending on the laser source capacity. The process is not restricted to a maximum size, but the marking area is linked to the geometric limitations of the facility.

The outer cover material is used for covering at least part of the structure of the spacecraft during its manufacturing. The marking of a surface of said outer cover material may be performed prior to covering the structure of the spacecraft with said material. Alternatively, the marking of the surface may be performed once the cover material is assembled onto the spacecraft.

EXAMPLES

Figure 2B:
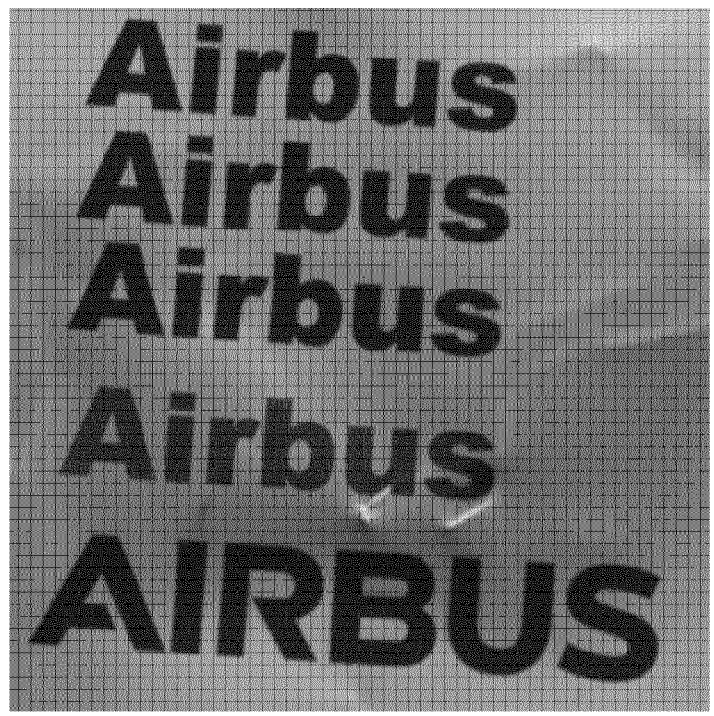
FIG. 2b shows an example of marking obtained on a surface made of black Kapton.
Figure 2A:
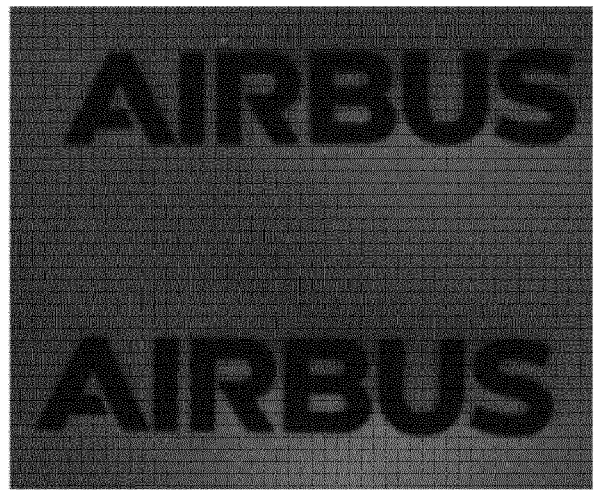
FIG. 2a shows an example of marking obtained on a surface made of StaMet-coated black Kapton.

With reference to FIGS. 2a and 2b are shown exemplary markings obtained respectively on StaMet-coated black Kapton and black Kapton, with the laser parameters indicated above.

The emissivity ε and absorptance α of the surface exposed to the laser source were measured before and after exposition to the laser and are provided in the tables below.

The emissivity of the surface of a material is its effectiveness in emitting energy as thermal radiation. It is the ratio of the thermal radiation from a surface to the radiation from an ideal black surface at the same temperature.

The absorptance of the surface of a material is its effectiveness in absorbing radiant energy. It is the ratio of the absorbed to the incident radiant power.

| StaMet-coated black Kapton foil | Unmarked | Laser marked |
|---|---|---|
| $\varepsilon_{20°}$ | 0.875 | 0.868 |
| $\varepsilon_{80°}$ | 0.807 | 0.802 |
| $\varepsilon_{180°}$ | 0.777 | 0.772 |
| α | 0.494 | 0.950 |

| Black Kapton foil | Unmarked | Laser marked |
|---|---|---|
| $\varepsilon_{20°}$ | 0.880 | 0.914 |
| $\varepsilon_{80°}$ | 0.809 | 0.869 |
| $\varepsilon_{180°}$ | 0.780 | 0.803 |
| α | 0.933 | 0.963 |

As can be seen on FIG. 2a, Stamet-coated black Kapton has a relatively light color and the marking results in darker areas, hence an important increase of absorptance. By contrast, black Kapton is a darker material and, while the marking remains visible, the contrast between marked areas and unmarked areas is not as pronounced, and the increase in absorptance is also reduced (3%).

Hence, one can select the outer cover material, and in particular the material forming the surface to be marked, according to its requirements in terms of absorptance.

The surface conductivity of the material was also measured before and after exposition to the laser, and no change was observed.

Last, no detachment of particles was observed after cleaning the exposed surface with a piece of tissue impregnated with isopropyl alcohol.

The invention claimed is:

1. A method of manufacturing a spacecraft comprising selecting an outer cover material for the spacecraft, the outer cover material having an inner surface and an outer surface, said outer surface being electrically conductive, wherein the method further comprises partially exposing the outer surface of the outer cover material to laser source to achieve a marking on said outer surface.

2. The method according to claim 1, wherein the outer cover material is a multilayer insulation blanket.

3. The method according to claim 1, wherein the physical integrity of the outer surface of the outer cover material is preserved during its exposure to the laser source.

4. The method according to claim 1, wherein the exposing the outer surface to laser source is performed such that the emissivity of the material forming the exposed surface varies between marked areas and unmarked areas.

5. The method according to claim 1, wherein the outer surface exposed to laser source is formed of a material elected within the group consisting in black polyimide, germanium-coated polyimide, germanium-coated black polyimide, StaMet-coated polyimide and StaMet-coated black polyimide.

6. The method according to claim 1, wherein the outer surface exposed to laser source is devoid of photosensitive material.

7. The method according to claim 1, wherein the laser is a UV laser, in the wavelength range of 350-370 nm, preferably of 355 nm.

8. The method according to claim 1, comprising performing the marking by moving the laser relatively to the exposed surface with a lateral speed comprised between 500 and 1500 mm/s, preferably a lateral speed of 1000 mm/s.

9. The method according to claim 1, wherein the laser exhibits an average power comprised between 0.5 and 2.6 W.

10. The method according to claim 1, wherein the laser is a pulsed laser operating at a frequency comprised between 1 and 50 kHz and with a pulse duration comprised between 10 and 100 nsec.

11. A spacecraft comprising an outer cover material exhibiting at least one marking on its outer surface, wherein the spacecraft is manufactured according to the method of claim 1.

12. A spacecraft according to claim 11, wherein the outer cover material is a multilayer insulation blanket.

13. A method of manufacturing a spacecraft, comprising:
selecting an outer cover material for the spacecraft, the outer cover material having an inner surface and an outer surface, said outer surface being electrically conductive, partially exposing the outer surface of the outer cover material to laser source to achieve a marking on said outer surface without removing material from the outer surface.

* * * * *